Patented Jan. 23, 1934

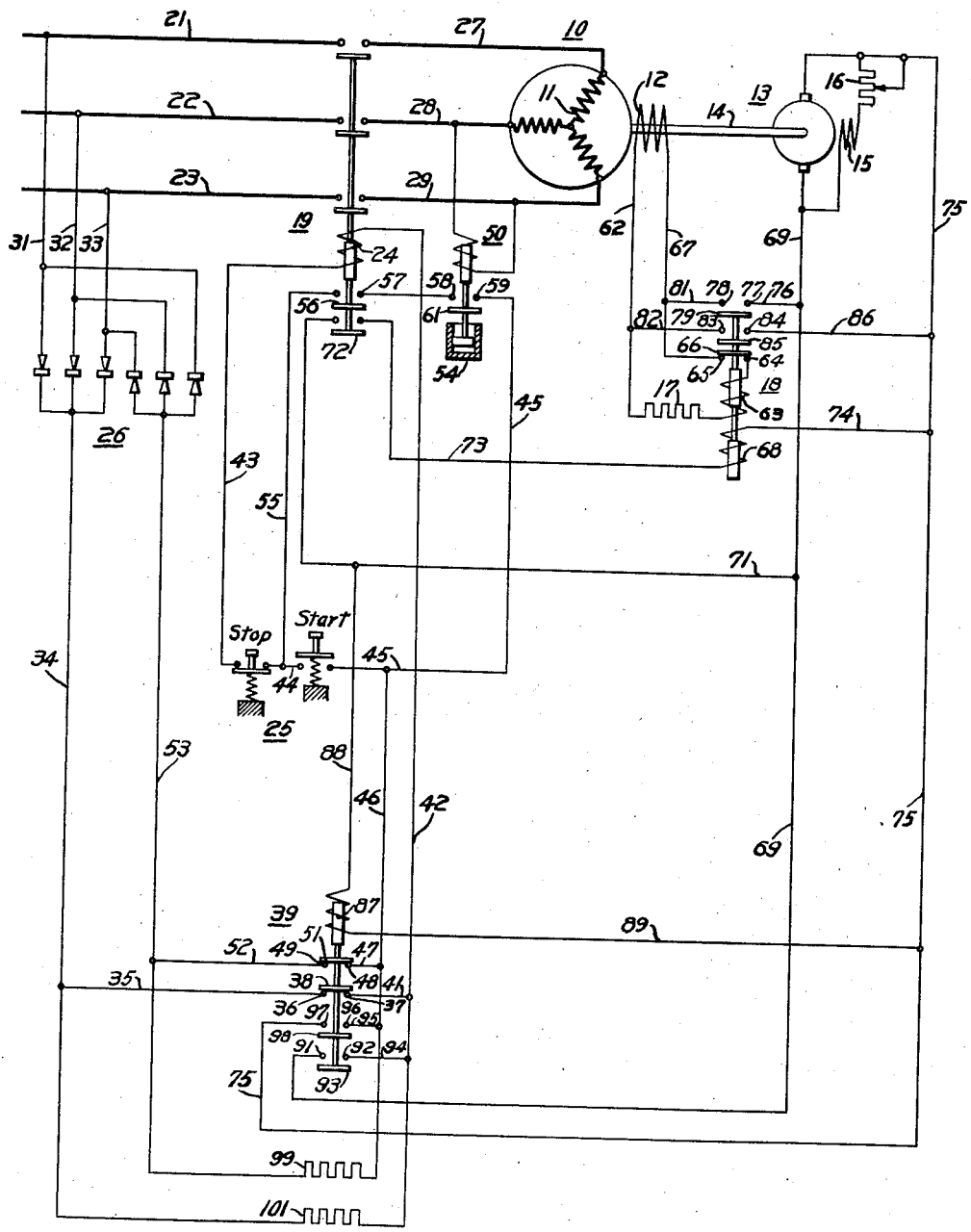

1,944,741

UNITED STATES PATENT OFFICE 1,944,741

CONTROL SYSTEM

Donovan E. Inman, Pittsburgh, Pa., assignor to Westinghouse Electric & Manufacturing Company, a corporation of Pennsylvania Application December 19, 1930
Serial No. 503,405

8 Claims. (Cl. 172—289)

My invention relates generally to motor-control systems and more particularly to motor-control systems comprising under-voltage protective features.

As all electric power systems are subject to voltage fluctuations, caused by lightning or other disturbances, it is desirable to provide equipment for protecting the motors and other apparatus, connected to the system, against such fluctuations.

Since electric motors will not operate satisfactorily at a reduced voltage, it is necessary to disconnect the motors from the power source when the voltage of the power source falls below its normal value. However, if the drop in voltage is only of a few seconds duration, as is quite often the case on large power systems, it is desirable to prevent the motors from being disconnected from the power source in order to prevent unnecessary delays in operation and injury to the product. Most motors of present-day design are capable of carrying their loads for a few seconds at a reduced voltage, and, if the voltage is raised to normal within that time, it is not necessary to disconnect the motors from the power source, thereby avoiding unnecessary shut-downs of the motor equipment.

An object of my invention, generally stated, is to provide a motor-control system which shall be simple and efficient in operation and which may be readily and economically manufactured and installed.

A more specific object of my invention is to prevent an electric motor from being disconnected from its power source, upon the occurrence of an abnormal condition on the power system, for a predetermined time interval after the occurrence of the abnormal condition.

Another object of my invention is to provide for energizing the actuating means of the switching devices of an alternating-current motor-control system from the alternating-current source through a rectifier, while the motor is being started and then automatically transferring the connections for the actuating means to a direct-current source.

For a fuller understanding of the nature and objects of the invention, reference may be had to the following detailed description, taken in connection with the accompanying drawing, in which the single figure is a diagrammatic view of a motor-control system connected in accordance with my invention.

Referring now to the drawing, the system shown comprises a motor 10, which may be of any suitable type. In the particular system illustrated, a synchronous motor, having an armature winding 11 and a field winding 12, is shown.

In order to energize the field winding 12, an exciter 13 is provided. In accordance with standard practice, the exciter 13 is directly connected to the motor 10 by means of a shaft 14 and, therefore, rotates at the same speed as the motor. The exciter 13 is provided with a shunt field winding 15 which is connected across the armature of the exciter through a variable rheostat 16. By adjusting the variable rheostat 16, the voltage of the exciter 13 and, consequently, the exciting current supplied to the field winding 12 of the motor 10 may be varied.

With a view to preventing an excessively high voltage being induced in the field winding 12, while the motor 10 is being started, also, in order to increase the starting torque, provision is made for connecting the field winding 12 in series with a resistor 17 during the starting operation. A field transfer relay 18 may be utilized for automatically connecting the field winding 12 across the exciter 13 when the motor 10 has accelerated to the proper speed.

As is the usual practice, a line switch 19 is provided for connecting the armature winding 11 to a three-phase source of power supplied by line conductors 21, 22 and 23. The line switch 19 is normally biased to the open position by gravity, and may be actuated to the closed position by energizing a coil 24.

The energization of the actuating coil 24 of the line switch 19 may be controlled by push-button switches 25, the one switch being commonly known as the "start" push button and the other as the "stop" push button. It will be observed that the "start" push button is normally biased to the open position by a spring, and the "stop" push button is normally biased to the closed position by a similar spring.

In order that the energization of the coil 24 of the line switch 19 shall not be affected by fluctuations in the voltage of the alternating-current power source, the coil 24 may be energized by the direct-current exciter 13. However, since the voltage of the exciter 13 will not have reached its normal value until the motor 10 has accelerated to its normal speed, it is necessary to provide another source of direct current for energizing the coil 24 during the starting operation of the motor 10. This may be accomplished by providing a rectifier 26 which rectifies alternating current to direct current in a manner well known to those familiar with the art.

Assuming now that the "start" push button is actuated to the closed position, then the coil 24 will be energized and the line switch 19 actuated to the closed position to connect the armature winding of the motor 10 to the line conductors 21, 22 and 23 through conductors 27, 28 and 29, respectively. The circuit for the coil 24 extends from conductors 21, 22 and 23, through conductors 31, 32 and 33, to one side of the rectifier 26, through conductor 34, conductor 35, contact members 36 and 37—bridged by contact segment 38 of a relay 39—conductors 41 and 42, through the coil 24, conductor 43, the "stop" push-button switch, conductor 44, the "start" push button switch, conductors 45, 46 and 47, contact members 48 and 49—bridged by a contact segment 51 of the relay 39—conductors 52 and 53, through the other side of the rectifier 26, back to the conductors 31, 32 and 33.

Immediately upon the energization of conductors 27, 28 and 29 by the closing of the line switch 19, the motor 10 starts to rotate, and also a voltage relay 50, the coil of which is connected across conductors 28 and 29, is energized. The relay 50 may be so constructed that it will be actuated to the closed position when its coil is energized by the normal voltage of the motor 10 and will start to open its contact members if the applied voltage drops below this normal value. However, the relay 50 may be provided with a dash pot 54 or other suitable time-delay mechanism, which will prevent the contact members from being opened for a predetermined time interval after the drop in the voltage applied to the coil of the relay.

Upon the closing of the contact members of the relay 50, a holding circuit is established for the coil 24 of the line switch 19, and the "start" push button may then be released by the operator. The holding circuit extends from conductor 44, through conductor 55, an interlock 56 on the switch 19, conductor 57, contact members 58 and 59—bridged by contact segment 61 of the relay 50—to conductor 45.

As previously explained, the field winding 12 of the motor 10 is connected in series with a resistor 17, in order to prevent an excessive voltage being induced in the field winding and to increase the torque of the motor 10 while it is being started. The circuit for the field winding extends from one side of the field winding 12, through conductor 62, the resistor 17, a coil 63 of the relay 18, contact members 64 and 65—bridged by the contact segment 66 of the relay 18—through conductor 67, to the other side of the field winding 12.

It will be observed that the relay 18 is provided with two coils, the coil 63 and also a coil 68. The relay is so constructed that it is biased to its lowermost position by the coil 63. The coil 68 is wound to oppose the action of the coil 63 and biases the relay 18 to its uppermost position.

In order that the field winding 12 shall be automatically transferred to the exciter 13 when the motor 10 has accelerated to its normal speed, the coil 68 of the relay 18 is connected across the exciter 13. The circuit for the coil 68 extends from one side of the exciter 13, through conductor 69, conductor 71 an interlock 72 on the switch 19, conductor 73, through the coil 68, conductors 74 and 75, back to the other side of the exciter 13.

It will be understood that the voltage of the exciter 13 will be at its normal value when the motor 10 has accelerated to its normal speed. Accordingly, the coil 68 of the relay 18, which is energized by the exciter 13, will overcome the action of the coil 63 when the exciter voltage becomes normal, and the relay 18 will be actuated to its uppermost position, thereby connecting the field winding 12 across the exciter 13. The circuit for the field winding 12 then extends from conductor 69, through conductor 76, contact members 77 and 78—bridged by the contact segment 79 of the relay 18—through conductors 81 and 67, through the field winding 12, conductors 62 and 82, contact members 83 and 84—bridged by contact segment 85 of the relay 18—and conductors 86 and 75, back to the exciter 13.

When the voltage of the exciter 13 has reached its normal value, the exciter may be utilized to energize the coil 24 of the line switch 19, thereby reducing the duty imposed on the rectifier 26. The relay 39 is provided to automatically transfer the connections for the coil 24 from the rectifier 26 to the exciter 13. The actuating coil 87 of the relay 39 is energized by the exciter 13. The circuit extending from conductor 69, through conductors 71 and 88, the coil 87 and conductor 89, to conductor 75. Accordingly, when the exciter voltage is at its normal value, the relay 39 is actuated to its uppermost position, thereby connecting the exciter 13 to the coil 24 of the relay 19. The circuit for the coil 24 will then extend from conductor 69, through contact members 91 and 92—bridged by contact segment 93 of the relay 39—through conductors 94 and 42, to the coil 24, thence, through the holding circuit previously traced for the coil 24, to conductor 46, conductor 95, contact member 96 and 97—bridged by contact segment 98 of the relay 39—to conductor 75. When the relay 39 is actuated to its uppermost position, the circuits through its contact segments 51 and 38 are interrupted, and the rectifier 26 is connected to the conductors 46 and 42 through the resistors 99 and 101. The current supplied by the rectifier 26 will, therefore, be reduced by the resistors 99 and 101. However, it will be readily understood that the resistors 99 and 101 may be so constructed that they will permit a sufficient amount of current to flow through the coil 24 to prevent the relay 19 from being actuated to its open position while the connections to the coil 24 are being transferred from the rectifier 26 to the exciter 13, upon the actuation of the relay 39. If it is desired to omit the resistors 99 and 101, the relay 39 may be so constructed that the contact segments 93 and 98 will bridge their respective contact members before the circuits through contact segments 38 and 51 are interrupted.

As previously explained, it is necessary to disconnect the motor 10 from its source of power in case the voltage of the power source drops below its normal value. However, it is desirable to prevent the motor from being disconnected from the power source in case the voltage drop is of only a few seconds duration, as the motor is capable of carrying its load at a reduced voltage for short periods of time.

As previously described, the holding circuit for the coil 24 of the line switch 19 extends through the contact members 58 and 59 of the voltage relay 50, which is connected across the conductors 28 and 29 of the motor circuit. Therefore, when the voltage of the power source drops below its normal value, the holding circuit for the coil 24 will be interrupted, and the line switch 19 will be actuated to its open position, thereby disconnecting the motor 10 from the power conductors 21, 22, 23. However, the relay 50 is provided with a time-delay mechanism 54 which prevents the circuit through its contact members 58 and 59 from being interrupted for a predetermined time interval after a drop in the applied voltage thus preventing the deenergization of the coil 24 for a predetermined time interval. Accordingly, if the voltage of the power source returns to its normal value before the expiration of this time interval, the motor 10 will not be disconnected from the power source.

Since numerous changes may be made in the above-described construction, and different embodiments of the invention may be made without departing from the scope thereof, it is intended that all matter contained in the foregoing description, or shown in the accompanying drawing shall be interpreted as illustrative and not in a limiting sense.

I claim as my invention:

1. In a motor-control system, in combination, an alternating-current motor, an exciter for energizing the field winding of the motor, a source of power for the motor, a switch for connecting the motor to the source of power, a coil disposed to actuate the switch when energized by a direct current, a rectifier disposed to energize the coil, and means for automatically transferring the connections for the switch-actuating coil from the rectifier to the exciter under predetermined conditions.

2. In a motor-control system, in combination, an alternating-current motor, an exciter for energizing the field winding of the motor and disposed to be driven by the motor, a source of power for the motor, a switch for connecting the motor to the source of power, a coil disposed to actuate the switch when energized by a direct current, a rectifier connected to the source of power for the motor and disposed to energize the switch-actuating coil, and means for automatically transferring the connections for the switch-actuating coil from the rectifier to the exciter under predetermined conditions.

3. In a motor-control system, in combination, an alternating-current motor, an exciter for energizing the field winding of the motor, means for mechanically connecting the exciter to the motor, a source of power for the motor, a switch for connecting the motor to the source of power, a coil disposed to actuate the switch when energized by a direct current, a rectifier connected to the source of power for the motor and disposed to energize the switch-actuating coil, and a relay for automatically transferring the connections for the switch actuating coil from the rectifier to the exciter when the voltage of the exciter attains a predetermined value.

4. In a motor-control system, in combination, an alternating-current motor, an exciter for energizing the field winding of the motor, means for mechanically connecting the exciter to the motor, a source of power for the motor, a switch for connecting the motor to the source of power, a coil disposed to actuate the switch when energized by a direct current, a rectifier connected to the source of power for the motor and disposed to energize the switch-actuating coil, a relay for automatically transferring the connections for the switch-actuating coil from the rectifier to the exciter when the voltage of the exciter attains a predetermined value, and means for preventing the switch-actuating coil from being deenergized while the transfer is being made.

5. In a motor-control system, in combination, an alternating-current motor, an exciter for energizing the field winding of the motor, means for mechanically connecting the exciter to the motor, a source of alternating-current power for the motor, switching means for connecting the motor to the source of power, means for actuating the switching means when energized by a direct current, rectifying means connected to an alternating-current source of power and disposed to energize the switching-actuating means, and means responsive to the voltage of the exciter for automatically transferring the connections for the switch-actuating means from the rectifying means to the exciter when the voltage of the exciter attains a predetermined value.

6. In a motor-control system, in combination, an alternating-current motor, an exciter for energizing the field winding of the motor, means for mechanically connecting the exciter to the motor, a source of alternating-current power for the motor, switching means for connecting the motor to the source of power, means for actuating the switching means when energized by a direct current, rectifying means connected to an alternating-current source of power and disposed to energize the switch-actuating means, relay means responsive to the voltage of the exciter for automatically transferring the connections for the switch-actuating means from the rectifying means to the exciter when the voltage of the exciter attains a predetermined value, and resistor means disposed to prevent the switch-actuating means from being deenergized while the transfer is being made.

7. In a motor-control system, in combination, an alternating-current motor, a source of alternating-current power for the motor, a source of direct current for energizing the field winding of the motor, switching-means for connecting the motor to the alternating-current source of power, means for actuating the switching means when energized by a direct current, rectifying means disposed to energize the switch-actuating means, and means for automatically transferring the connections for the switch-actuating means from the rectifying means to the source of direct current under predetermined conditions.

8. In a motor-control system, in combination, an alternating-current motor, a source of alternating-current power for the motor, a source of direct current for energizing the field winding of the motor, switching-means for connecting the motor to the alternating-current source of power, means for actuating the switching means when energized by a direct current, rectifying means disposed to energize the switch-actuating means, relay means for automatically transferring the connections for the switch-actuating means from the rectifying means to the source of direct current under predetermined conditions, and means for preventing the switch-actuating means from being deenergized while the transfer is being made.

DONOVAN E. INMAN.